United States Patent [19]
Costanzo

[11] Patent Number: 5,855,431
[45] Date of Patent: *Jan. 5, 1999

[54] ROTATING MIXER AND TRAY

[75] Inventor: Frank T. Costanzo, Phoenix, Ariz.

[73] Assignee: Coastal Sales Associates, Inc., Harriman, N.Y.

[*] Notice: The term of this patent shall not extend beyond the expiration date of Pat. No. 5,692,830.

[21] Appl. No.: 968,781

[22] Filed: Nov. 12, 1997

Related U.S. Application Data

[63] Continuation-in-part of Ser. No. 695,316, Aug. 9, 1996, Pat. No. 5,692,830.

[51] Int. Cl.$^6$ .................................................. A47J 43/046
[52] U.S. Cl. ........................ 366/199; 366/205; 366/206; 366/314
[58] Field of Search .................................. 366/130, 199, 366/204–206, 314, 349

[56] References Cited

U.S. PATENT DOCUMENTS

| | | |
|---|---|---|
| 1,480,914 | 1/1924 | Poplawski . |
| 1,762,353 | 6/1930 | Robinson . |
| 1,824,929 | 9/1931 | Pritchard . |
| 2,757,909 | 8/1956 | Wayne . |
| 2,758,623 | 8/1956 | Malz et al. . |
| 2,771,111 | 11/1956 | Seyeried . |
| 2,804,289 | 8/1957 | Schwaneke . |
| 3,240,246 | 3/1966 | Dewenter . |
| 3,537,691 | 11/1970 | Tsuruta et al. . |
| 3,704,864 | 12/1972 | Lee . |
| 3,901,484 | 8/1975 | Ernster . |
| 4,664,530 | 5/1987 | Kurome et al. .......................... 366/205 |
| 4,946,286 | 8/1990 | Purkapile ................................. 366/247 |
| 5,044,758 | 9/1991 | Kurtz ........................................ 366/77 |
| 5,353,697 | 10/1994 | Venturati et al. . |
| 5,639,161 | 6/1997 | Sirianni ................................... 366/314 |
| 5,720,552 | 2/1998 | Schindlegger ..................... 366/314 X |

FOREIGN PATENT DOCUMENTS

| | | |
|---|---|---|
| 0 562 310 A1 | 2/1993 | European Pat. Off. . |
| WO 95/16380 | 6/1995 | WIPO . |

Primary Examiner—Charles E. Cooley
Attorney, Agent, or Firm—Schmeiser, Olsen & Watts

[57] ABSTRACT

A rotating mixer for mixing drinks utilizes a tumbler-type container attached to a base and a rotatable whisk. The whisk is turned by rotatable gears, one of which is attached to a motor and one of which is attached to the base of the container. The motor is housed in a motor housing unit and is powered by batteries, or, alternatively, by an AC adapter. The motor housing unit includes a collar that is inserted into a sleeve in the bottom of the container base to provide a stable guide for aligning the motor gear and whisk gear. The detachable base also provides a stable platform for the container when it is not engaged with the motor housing unit. The detachable base may be a lightweight, yet sturdy, two-piece unit comprising a sleeve section and a coupling section. The motor housing unit fits into a tray which is adapted for use as a serving tray and which also functions as a battery recharger when plugged into an electrical outlet. The tray comprises holders for holding one or more containers.

6 Claims, 10 Drawing Sheets

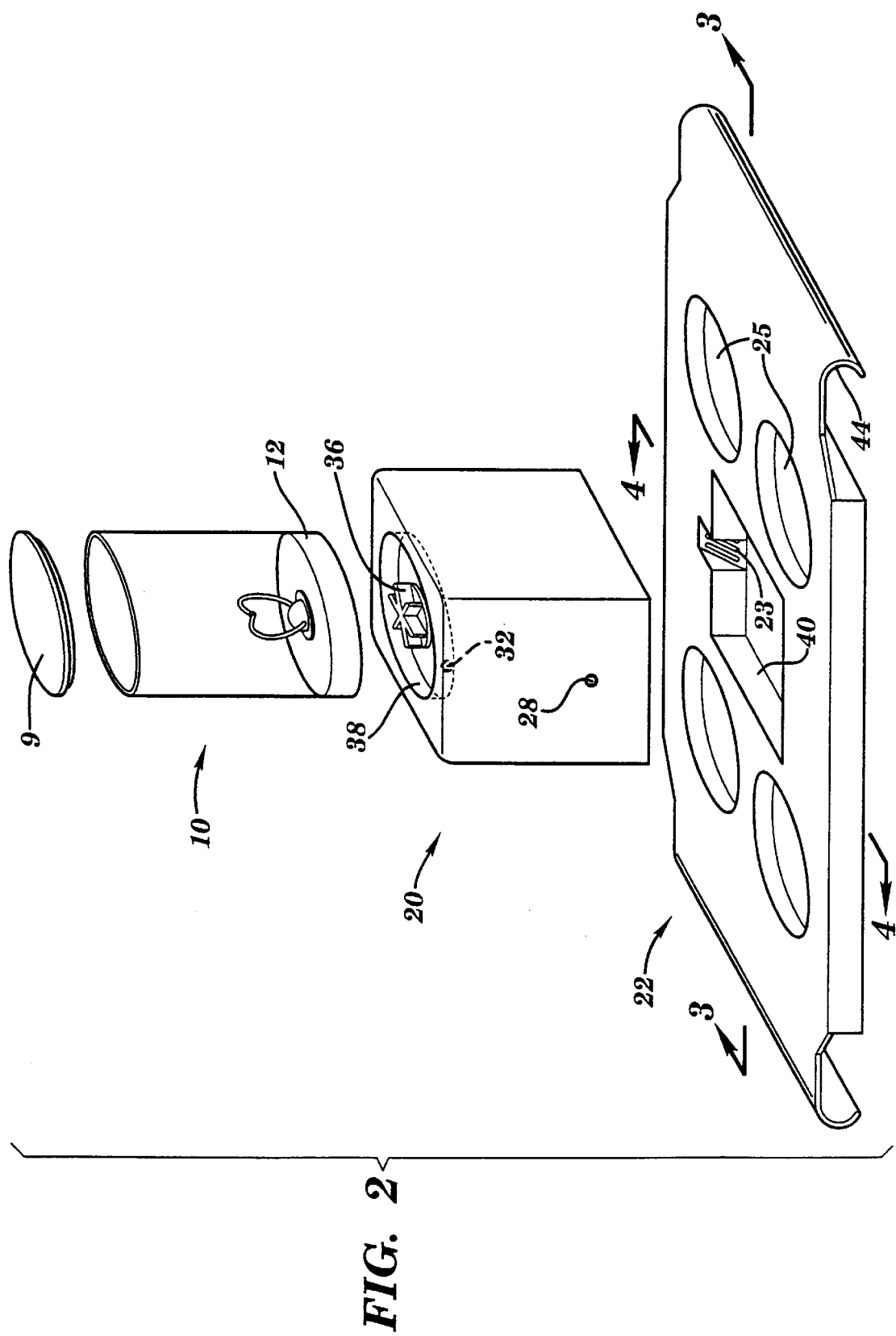

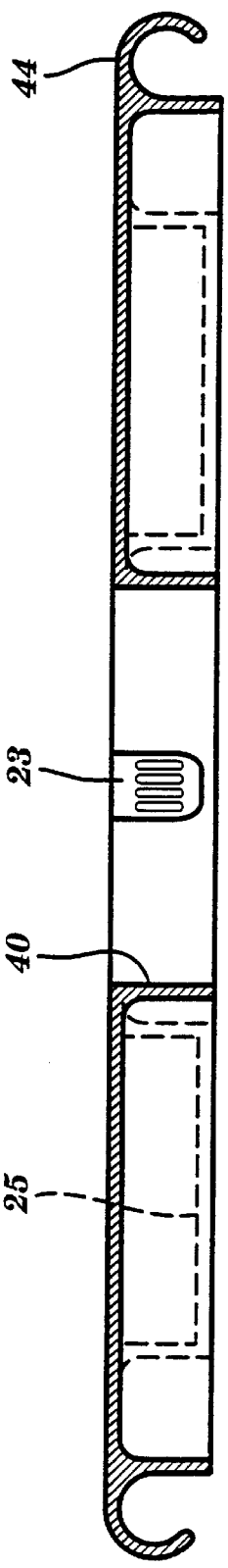
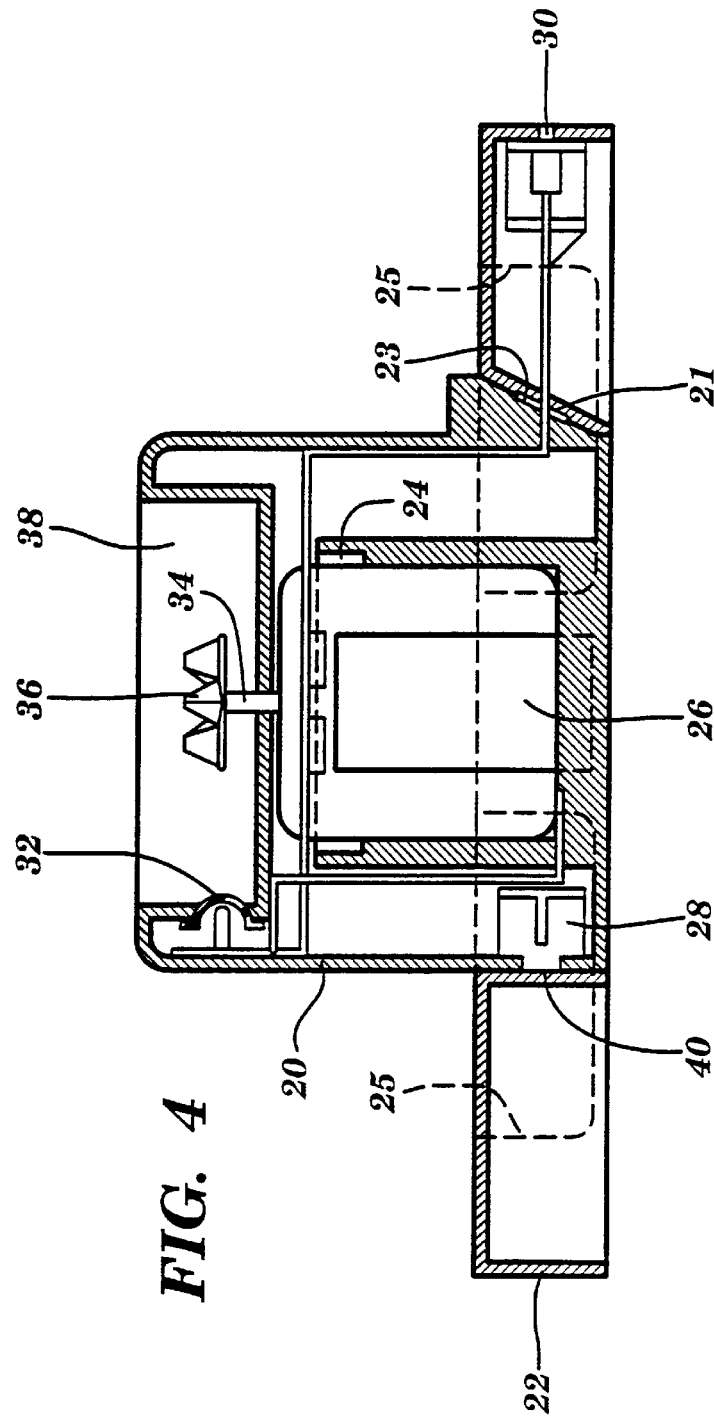

ROTATING MIXER AND TRAY

RELATED APPLICATION

This application is a continuation-in-part of the earlier patent application by Frank T. Costanzo entitled "ROTATING MIXER AND TRAY" Ser. No. 08/695,316 filed Aug. 9, 1996, now U.S. Pat. No. 5,692,830.

BACKGROUND OF THE INVENTION

1. Technical Field

The present invention relates generally to mixing devices. More specifically, the present invention relates to improvements in free standing blender-type devices for mixing individual drinks and the like.

2. Background Art

Many drinks are made by combining several ingredients including fluids, powders and/or syrups. Manually stirring such drinks rarely produces a thorough combination. Instead, the heavier of the ingredients often concentrates at the bottom, while the lighter ingredients rise to the top. Shaking drinks may produce a more thorough combination than stirring, but still often fails to produce the desired result. Furthermore, since few containers are well adapted for either shaking or stirring, these tactics often increase spillage.

To address these problem, blenders and mixers of various sorts are sometimes used to more thoroughly combine ingredients added to a drink. Since blenders usually employ tight fitting lids, the problem of spillage is minimized. Furthermore, blenders mix their contents at faster speeds than stirring or shaking, thus producing a more thorough combination of the ingredients.

Blenders and other similar mixing devices have problems of their own however. Most blenders are larger than a single drink serving, thus necessitating that mixed contents be poured into separate containers (e.g., glasses) for serving. This creates the possibility of spillage as the drink or other fluid combination is poured from the blender or mixing device to a usually smaller container.

Furthermore, blenders separate the process of preparation from the processes of service and consumption. Thus, there is often enough lag time between mixing and consumption to allow the contents to settle and partially separate.

Blenders and other similar mixing devices also require the user to manually activate the blending mechanism. This may slow preparation time.

Finally, after the contents of the blender are transferred to another container, no further mixing can occur without re-transferring the drink back to the blender. Thus, even if a drink or other fluid mixture is immediately served after it is mixed, if it is not immediately consumed, some degree of settling and separation of the contents is bound to occur. This cannot be remedied without re-transferring the drink to the blender or other mixing device or resorting to another method for mixing drinks such as stirring or shaking.

Many blender-type mixing devices have been invented in attempting to address these problems. Among these are U.S. Pat. No. 1,762,353 to Robinson, U.S. Pat. No. 1,824,929 to Pritchard, U.S. Pat. No. 2,758,623 to Malz et al., U.S. Pat. No. 3,704,864 to Lee, and U.S. Pat. No. 4,946,286 to Purkapile and EPO 0 562 310 A1 issued to Schindlegger.

U.S. Pat. No. 1,762,353 to Robinson discloses a manually operable mixing device which provides a substantially cylindrical receptacle, with an open top and a blade-bearing agitator which is operable as a non-rotatable piston in the receptacle. The agitator consists essentially of a cover and a stem with a handle and a blade. The stem runs through a hole in the cover so that when the cover is in place on the receptacle the handle may be used to move the blade up and down, thus mixing the contents of the receptacle.

This device however, must be operated manually. Furthermore, once mixing is complete, the agitator and cover must be removed and the contents of the mixer transferred into serving containers. This increases spillage and necessitates additional clean-up because the blade and lower portion of the stem have been immersed in the contents of the receptacle and are very likely to drip when removed. Also, the step of transferring the contents from mixer to serving containers increases the likelihood of spillage.

U.S. Pat. No. 1,824,929 to Pritchard discloses a drink mixer which utilizes a tumbler or similar container for a mixing receptacle. The tumbler has a removable top with a central bearing orifice adapted to slidably receive the rod of the mixing device. On one end of the rod is a handle and on the other end of the rod is a mixing disc which may be dish formed.

Although this device provides for mixing contents within a container that may also be used for serving, thus eliminating the need for transferring contents from one container to another, it is still likely to create spillage when the mixing disc and cover are removed from the container. Because the mixing disc and the rod have been immersed in the contents of the container, spilling or dripping may occur when the rod and mixing dish are removed prior to serving the drink. Also, this device must be manually operated.

U.S. Pat. No. 2,758,623 to Malz et al. discloses a liquefier having a resiliently mounted motor and container. This liquefier device includes a base having an electric motor, and a container with cutting blades mounted on the bottom of its interior. Because of the motor, no manual operation is necessary. However, the problem of spillage still exists with this mixer because of the necessity of transferring the contents out of the container after mixing. Also, because the motor must be plugged in, portability of the device is limited.

U.S. Pat. No. 3,704,864 to Lee discloses a mixer unit which may be removably, sealingly affixed to the top of a receptacle containing the material to be mixed and the combination thereafter inverted during the mixing operation. Although this invention may be used with serving containers such as tumblers and it may be portable (i.e. battery powered), it still presents some problems. First, because the mixer unit is attached to the top of a receptacle, the receptacle must be inverted before the mixer unit functions properly. This creates a possibility of spillage because if the mixer is in any way improperly attached or if there is some sealing defect between the mixer unit and the receptacle, the contents of the receptacle will literally be dumped out when it is inverted. Second, even if no leakage or spillage occurs when the unit is inverted, there is likely to be some dripping or spilling when the unit is returned to its upright position and the mixing unit, which has been immersed in the contents during mixing, is removed.

U.S. Pat. No. 4,946,286 to Purkapile discloses a liquid pitcher including a removable lid and a rotary and reciprocal shaft journaled in the lid and having an apertured grinding and mixing plate attached to one end of the shaft. The grinding and mixing plate includes a plurality of mixing holes, four equally spaced semicircular rim segments, and a set of grinding teeth located on the underside thereof facing a set of fixed grinding teeth located in a row on the bottom of the pitcher with the two sets of teeth being mutually facing and interfitting. The mixer plate can be rotated to grind up frozen concentrate or reciprocated within the container to mix liquids therein. The holes in the aperture plate provide a mixing action in both the rotary and reciprocating modes of operation.

This device, by its nature, necessitates transfer of its contents to serving containers after mixing. Because the pitcher is constructed so as to facilitate pouring (i.e. it has a spout, etc.), spillage will probably not be a large problem, but still could be possible. The pitcher is portable, but must be manually operated. Furthermore, if it becomes desirable to re-mix a drink, the lid, shaft and mixing plate must be removed and the drink would have to be added back to the contents of the pitcher. Neither of these actions are ideal as removing the lid, shaft and mixing plate increases the likelihood of spillage, and re-introducing the drink to the pitcher could result in spreading germs.

EPO 0 562 310 A1 to Schindlegger discloses a mixing apparatus having a container and a variety of different shaped whisks. The Schindlegger patent uses a rotary drive to rotate a whisk within the container for mixing the drink.

Each of the devices discussed above possesses desirable features and advantages. However, none of them adequately address all of the problems discussed above relating to mixing devices for mixing drinks and the like. The references discussed above are hereby incorporated by reference.

DISCLOSURE OF INVENTION

The present invention provides an improvement upon free-standing blender devices for mixing individual drinks. This invention includes a single serving container having a tight fitting lid connected to a base with a rotating whisk. The container and base function as a single unit, which, in a preferred embodiment, are cylindrical in shape.

With the lid removed, the container looks and functions like a regular drinking glass. However, with the lid closed, the container and base may be placed in a motor housing unit containing a motor which rotates the whisk and mixes the contents of the container.

The motor housing unit runs on batteries or may be plugged into an electrical outlet via an AC adapter. Alternatively, the motor housing unit can be set into a tray for recharging of the batteries. The tray is then connected to an electrical outlet via the AC adapter.

The tray is adapted such that it may be used to serve drinks, containing two handles and a number of holders, or indentations, of adequate size to hold single serving containers such as the one described above. As mentioned, the motor housing unit may be set into the tray, thus providing a portable system for mixing and serving drinks.

Furthermore, since the tray is adapted for serving drinks, it will often be readily available if it is desirable to re-mix a drink. Since the mixer is automatically activated by insertion of the serving container into the motor housing unit, a person wanting to mix or re-mix a drink needs only to insert the serving container into the motor housing unit. Additionally, since drinks may be mixed and served within the container, spillage from transfer of the drink from one container to another is easily avoided.

Finally, because of the speed and shape of the rotatable whisk, this mixer, when operated produces a tornado or whirlpool-like effect as the contents are mixed. In a preferred embodiment when the container is fashioned from transparent material, this provides an entertaining visual effect.

It is therefore an advantage of the present invention to provide a rotating mixer which produces a thorough combination of its contents.

It is a further advantage of the present invention to provide a rotating mixer which minimizes spillage by using a single serving size container which also functions as a tumbler or drinking glass in order to avoid the need for transferring mixed contents from a mixing container to a drinking container.

It is a further advantage of the present invention to provide a portable mixing container, base, and serving tray which allows mixing of drinks immediately prior to consumption.

It is yet a further advantage of the present invention to provide a portable mixing container, base, and serving tray which allows easy, on-the-spot re-mixing of drinks if necessary, and allows drinks to be re-mixed without transferring the drink from the tumbler or drinking glass back to a mixing container.

It is therefore a further advantage of the present invention to provide a rechargeable motor housing unit which may be operated independently when charged, or which may be plugged into an electrical outlet either directly or via connection through a recharger tray.

It is therefore a further advantage of the present invention to provide a rotatable whisk that, because of its shape and speed of rotation, creates an entertaining tornado or whirlpool-like effect within the contents of the container.

It is therefore a further advantage of the present invention to provide a means for automatically stopping and starting rotation of the whisk with insertion of the container into the motor housing unit.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and:

FIG. 2 is an exploded top perspective view of a preferred embodiment of the present invention;

FIG. 3 is a cross-sectional front view taken along lines 3—3 in FIG. 2;

FIG. 4 is a cross-sectional view taken along lines 4—4 in FIG. 2;

BEST MODE FOR CARRYING OUT THE INVENTION

Figure 1:
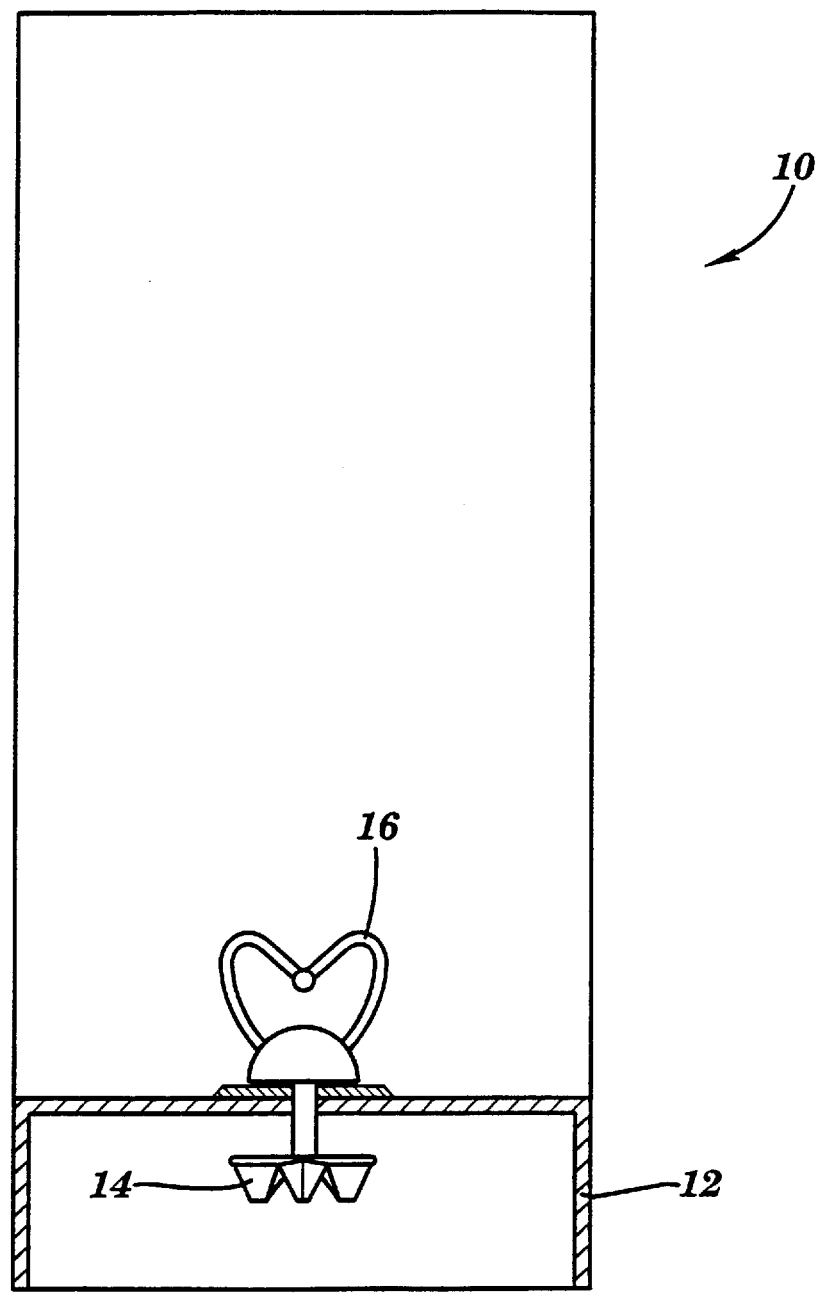
FIG. 1 is a front view of the first preferred embodiment of the container of the present invention.

Referring to FIG. 1, the container 10 is shown, in accordance with the first preferred embodiment of the present invention. The container is usually cylindrical in shape and is constructed from transparent material such as clear plastic. The base 12 of the container 10 is tightly attached, forming a seal so as to prevent leakage. The base has a recess underneath which houses a first gear 14. A whisk 16, which in one embodiment is substantially heart shaped, is attached by means of a shaft which extends through the base to a first gear 14 such that when the first gear 14 rotates the whisk 16 will also rotate.

Referring to FIG. 2, top perspective views of the container 10, motor housing unit 20 and tray 22 are shown, in accordance with a preferred embodiment of the present invention. The lid 9 is depicted, as is the container 10. The motor housing unit 20 provides a hollow space 38 which is adapted to receive the base 12 of the container 10. When the base 12 of the container 10 is inserted into the hollow space 38 of the motor housing unit 20, the flexible bubble switch 32 is depressed, thus activating the motor 24. The motor then rotates the shaft 34 (shown in FIG. 4), which rotates the second gear 36. Because the second gear 36 and the first gear 14 are engaged at this point, the first gear 14 is also rotated and the whisk, in turn, is also rotated. When the container 10 is detached from the motor housing unit 20, the pressure on the flexible bubble switch 32 is relieved, and the motor 24 is deactivated.

FIG. 2 also depicts the first jack 28, whereby the motor housing unit may be connected to an electrical outlet independent of the tray. The tray 22 is also shown in accordance with the first preferred embodiment of the present invention. A receptacle 40 is located in the tray for receiving the motor housing unit 20 into the tray 22. A plurality of holders 25 function to hold additional containers 10 after their contents have been mixed. In this embodiment, several handles 44 are included for grasping the tray 22. The second connecting means 23 for achieving an electrical connection is proximate the receptacle 40 for the motor housing unit 20. The first connecting means 21 (shown in FIG. 4) is positioned on the motor housing unit 20 so as to facilitate an electrically conductive pathway when the motor housing unit 20 and the tray 22 are in combination.

FIG. 3 depicts a cross sectional front view of the tray 22 at line 3—3. The second connecting means is shown here, as is the receptacle space 40 for the motor housing unit 20. The handles 44, and the tumbler holders 25 are also shown.

FIG. 4 depicts a cross sectional side view of the motor housing unit 20 at line 4—4. A cross sectional view of tray 22 at line 4—4 is also shown. The motor 24, may be powered by batteries 26 or by an AC adapter which can be connected at a first jack 28 when the motor housing unit 20 is apart from the tray, or to second jack 30 when the motor housing unit 20 is set within the tray 22. In this figure the motor housing unit is removably sitting in the receptacle 40 of the tray 22. When the motor housing unit 20 and tray 22 are in combination, a first connecting means 21 positioned on the motor housing unit 20 creates an electrical connection with the second connecting means 23 on the tray 22.

The motor 24 is activated when bubble switch 32 is depressed as when the container 10 is positioned in the hollow space 38 of the motor housing unit 20. When activated, the motor 24 rotates a shaft 34. Attached to the shaft is a second gear 36 which interconnects with the first gear 14 to cause whisk 16 to rotate when the container is set in the hollow space 38 of the motor housing unit 20. Also depicted here are the tumbler holders 25, which are adapted to hold extra containers 10 while the tray is being carried or used.

While not shown in the drawings, it should be appreciated that other features might be added to the invention. For example, it may be possible to utilize a sensor to determine whether there is liquid within the container. The sensor would interact with the bubble switch 32 in order to enable the bubble switch only when liquid is sensed within the container. Such a switch could either sense the weight of the liquid within the container or could use a light sensor to determine if the container is empty.

Second Embodiment

In addition to the benefits and advantages of the apparatus discussed above, other benefits and advantages may be realized through modification of the interconnection between the container and the motor housing unit. A second preferred embodiment of the present invention comprises a collar on the motor housing unit, instead of a hollow space, that corresponds to a cavity in a detachable base for the container. The collar prevents a user from interfering with the motor gear while the motor is running and also provides a stable guide for aligning the motor gear and whisk gear. The detachable base similarly makes possible the advantages of a stable guide and also provides a stable platform for the container when it is not engaged with the motor housing unit. Since the detachable base is a two-piece unit comprising a sleeve section and a coupling section, it can be of lightweight, yet sturdy, construction and minimize the amount of raw material required for fabrication. Finally, a pressure switch with a pre-determined pressure limit allows a full container of liquid to rest on the motor housing unit without activating the motor. Only when a user applies additional downward pressure will the motor activate. Accordingly, additional benefits and advantages are realized.

Figure 5:
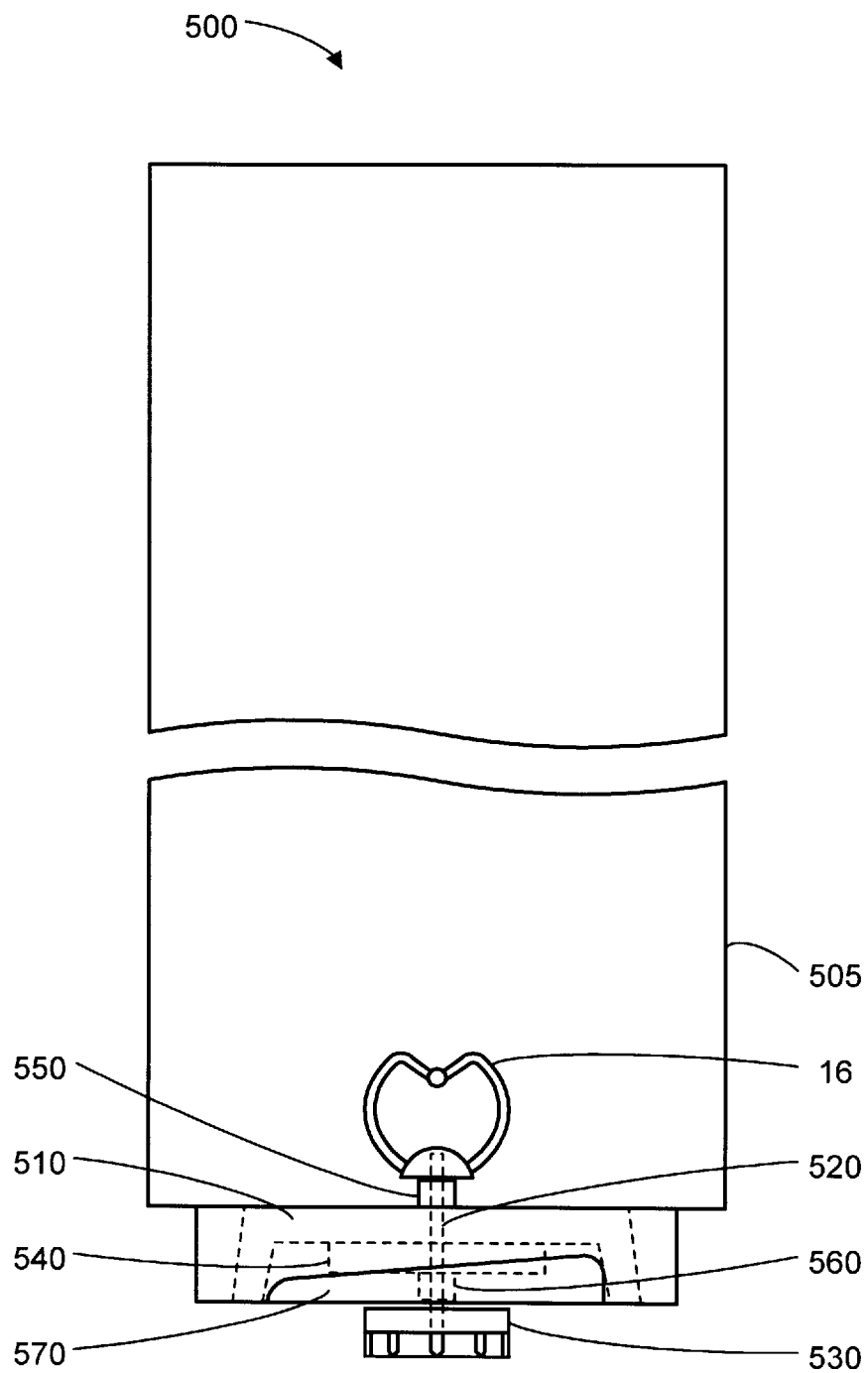
FIG. 5 is a front view of a second preferred embodiment of a container according to the present invention.

Turning now to FIGS. 5 to 12, a second preferred embodiment of a container comprises a detachable container 500 and a two-piece base 700 having benefits distinct from container 10 with a unitary base discussed above. FIG. 5 displays detachable container 500 comprising a cup portion 505, an end plate 510, a whisk 16, a gear shaft 520, and a whisk gear 530. End plate 510 is sealed in a liquid-tight association with cup portion 505, forming at least a portion of the bottom of detachable container 500 and providing an aperture for receiving gear shaft 520. Gear shaft 520 is connected to both whisk 16 and whisk gear 530 such that, when whisk gear 530 rotates about the longitudinal axis of gear shaft 520, whisk 16 rotates in a corresponding manner. Top bushing 550 operates to position whisk 16 a suitable distance above end plate 510, while spacer 540 and bottom bushing 560 operate to position whisk gear 530 a suitable distance below end plate 510. Also, spacer 540, top bushing 550, and bottom bushing 560 operate as liquid seals to prevent leakage through the aperture provided for gear shaft 520 in end plate 510. Preferably, top bushing 550 is formed integral to end plate 510 and bottom bushing 560 is formed integral to spacer 540. It is conceivable that spacer 540 could, in turn, be formed integral to end plate 510, however, such formation is not preferred.

Figure 6:
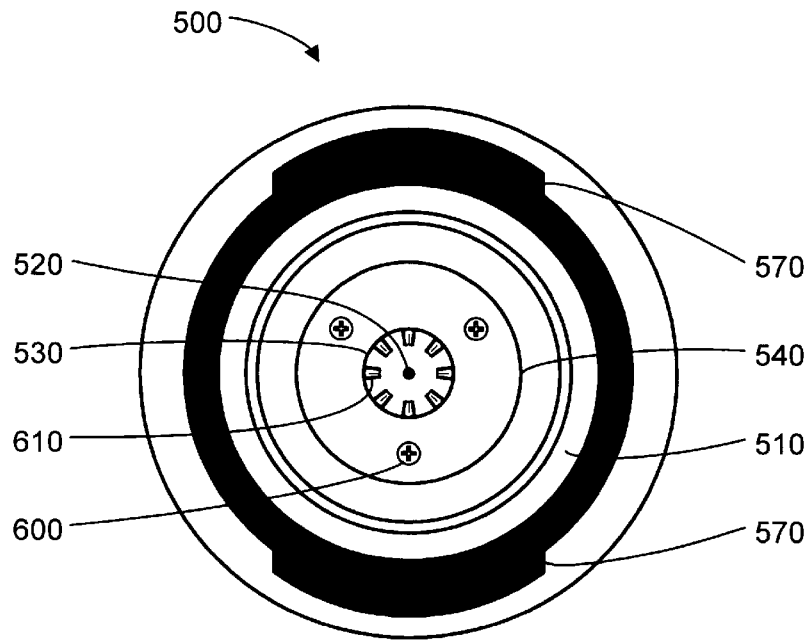
FIG. 6 is a bottom view of the container shown in FIG. 5.
Figure 12:
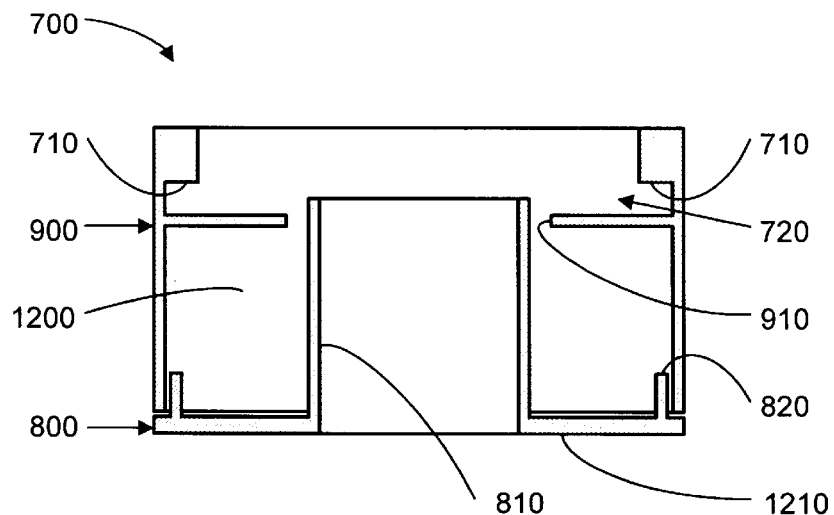
FIG. 12 is a cross-sectional front view taken along lines 12–12 of the base shown in FIG. 7.

FIG. 6 viewed in combination with FIG. 5 further describes detachable container 500. Two wedge-shaped locking blades 570 on detachable container 500 are provided for engaging two corresponding wedge-shaped locking blades 710 shown in FIG. 7 on two-piece base 700. As indicated in FIG. 12, a recess 720 is provided in two-piece base 700 for inserting a portion of detachable container 500 and then coupling it in place with a twisting motion. Although this is a preferred embodiment, clearly multiple other mechanisms for detachably coupling container 500 and base 700 may be suitable. Such mechanisms include threaded connections, latches, clasps, and screws among other things. However, the structure depicted in the appended drawings is preferred since it allows quick and easy detachment while providing a secure connection and it is simple to fabricate on container 500 and base 700. Other mechanisms must be glued or otherwise attached to container 500 and base 700, but locking blades 570 and 710 can be directly incorporated into and formed by fabrication molds for container 500 and base 700.

FIG. 6 also shows whisk gear 530 in greater detail connected to gear shaft 520 and screws 600 securing spacer 540 to end plate 510. Notably, teeth 610 of whisk gear 530 are suitably sized and positioned to encourage snug engagement with a similar motor gear 1310 shown in FIG. 13 and discussed below. To encourage whisk gear 530 and motor gear 1310 to slide easily into snug engagement, teeth 610 are also peaked. Teeth 610 could be fewer or greater in number than shown in FIG. 6 yet, the peaked teeth could still encourage sliding easily into a snug engagement if teeth 610 are sized and positioned suitably.

Figure 7:
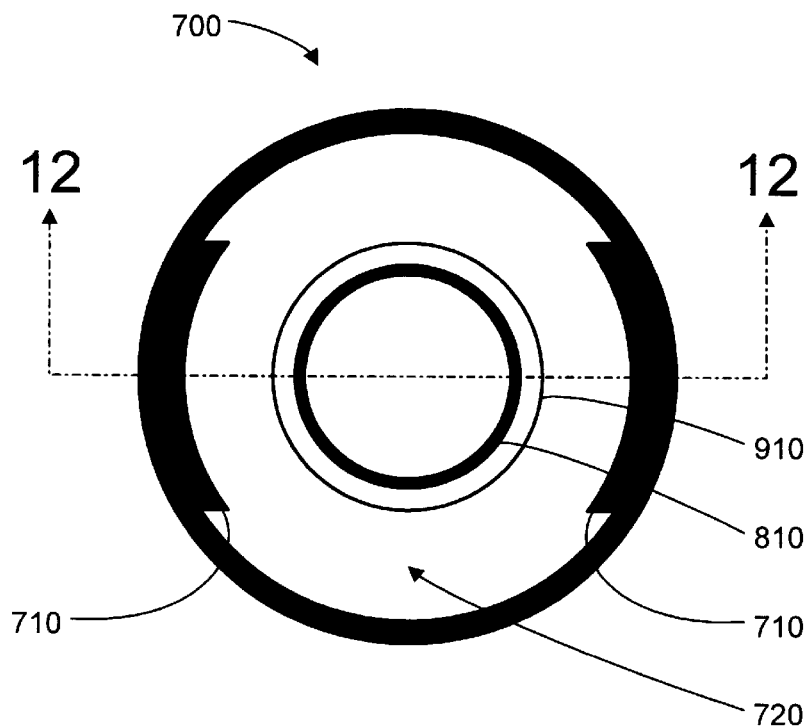
FIG. 7 is a top view of a detachable, two-piece base for use with the container shown in FIG. 5.

FIGS. 7 to 12 display two-piece base 700 comprising a sleeve section 800 and a coupling section 900. Sleeve section 800 shown separately in two preferred embodiments in FIGS. 8 and 10, primarily provides a sleeve 810 for receiving a collar 1320 on motor housing unit shown in FIGS. 13 and 14 and discussed below. Sleeve section 800 also provides a footing 1210 shown in FIG. 12 for contacting pressure switch 1330 shown in FIG. 13 when base 700 is placed on motor housing unit 1300. Coupling section 900 shown separately in two preferred embodiments in FIGS. 9 and 11, primarily provides a mechanism for detachably coupling base 700 to container 500. Coupling section 900 also provides an aperture 910 receiving sleeve 810 of sleeve section 800 when it is joined with coupling section 900. FIG. 7 shows a top view of both sections joined to form two-piece base 700, including a recess 720 for inserting a portion of detachable container 500 and then coupling it in place by twisting to engage locking blades 570 of container 500 with locking blades 710 of base 700. FIG. 7 also shows a top view of sleeve 810 through which collar 1320 is received when base 700 is placed on motor housing unit 1300. Aperture 910 is also shown through which sleeve 810 is received when sleeve section 800 is joined with coupling section 900.

FIG. 12 provides a cross-sectional view taken along lines 12—12 of the two-piece base 700 and the features described above. It is evident from FIG. 12 that base 700 is of a relatively thin-walled construction and that a relatively large void 1200 exists between sleeve 810 and the coupling section 900. Because base 700 is of a two-piece construction, void 1200 need not be filled to form sleeve 810. If base 700 were of a one-piece construction, then void 1200 would have to be filled to form both sleeve 810 and footing 1210. Filling void 1200 would increase the raw material required for base 700, correspondingly increasing its weight and cost. Unfortunately, it is difficult to create a mold for forming a one-piece base of lightweight, yet sturdy, construction having both a sleeve 810 and a footing 1210. Since attempts to design such a mold yield a base either too flimsy or too heavy, such a base is not preferred.

Figure 8A:
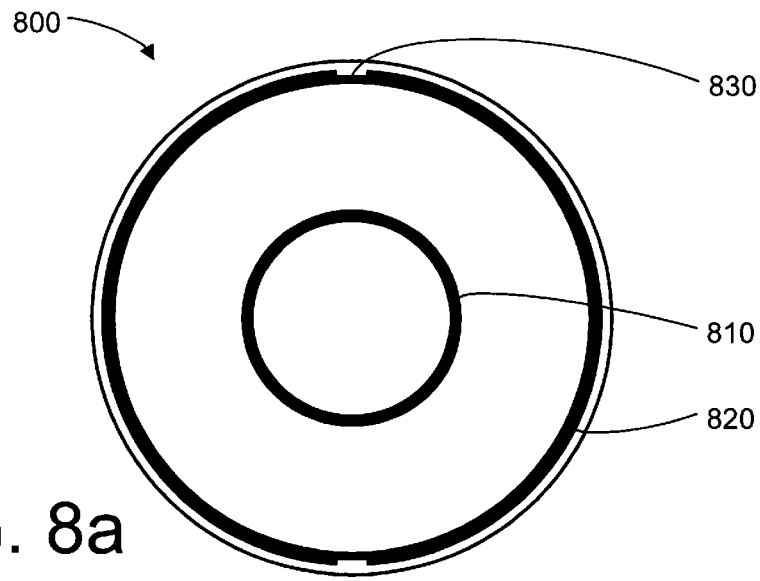
FIGS. 8a and 8b are, respectively, is a top view and a side view of a first embodiment of a sleeve section of the base shown in FIG. 7.
Figure 8B:
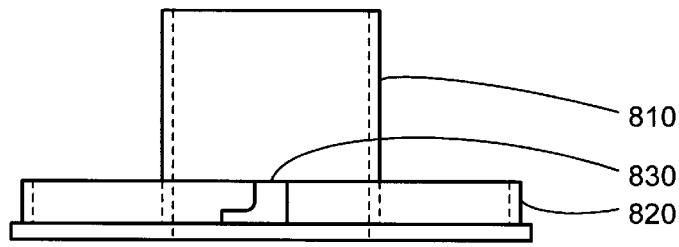
Figure 9:
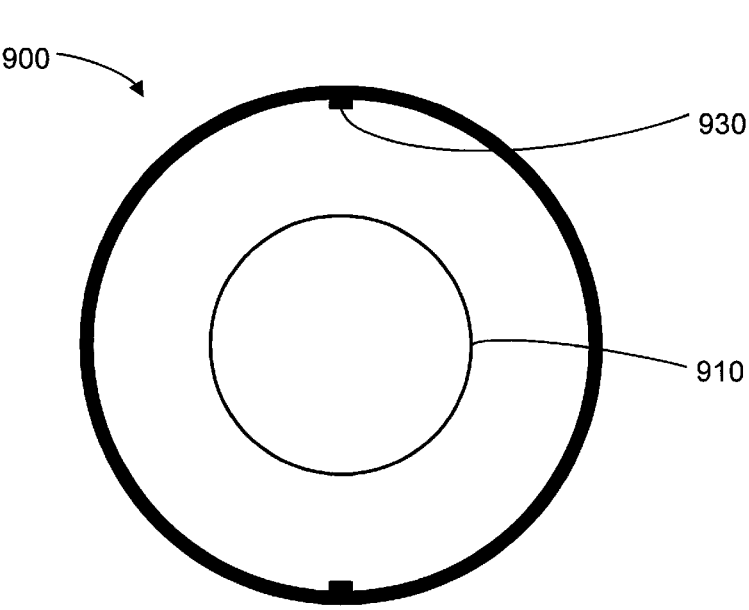
FIG. 9 is a bottom view of a first embodiment of a coupling section corresponding to the sleeve section shown in FIGS. 8a and 8b.
Figure 10:
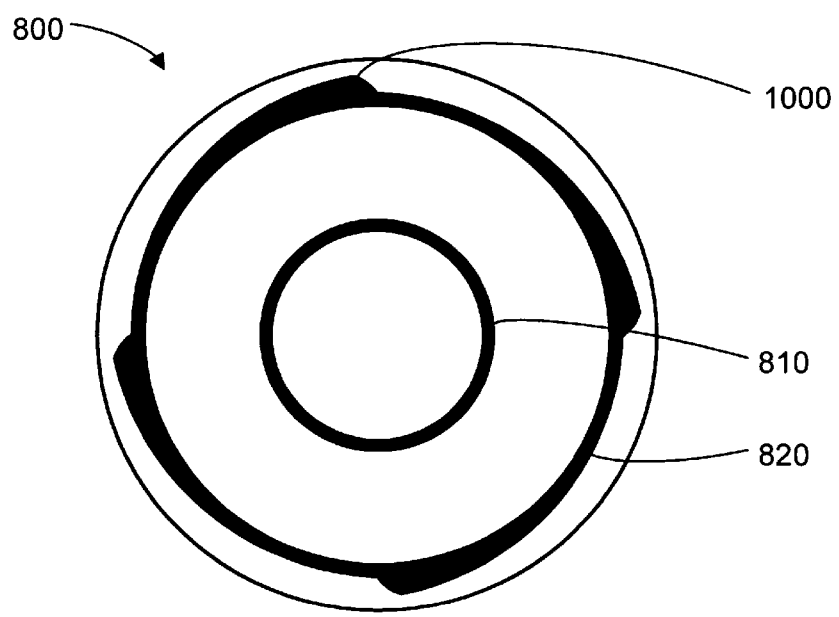
FIG. 10 is a top view a second embodiment of a sleeve section of the base shown in FIG. 7.
Figure 11:
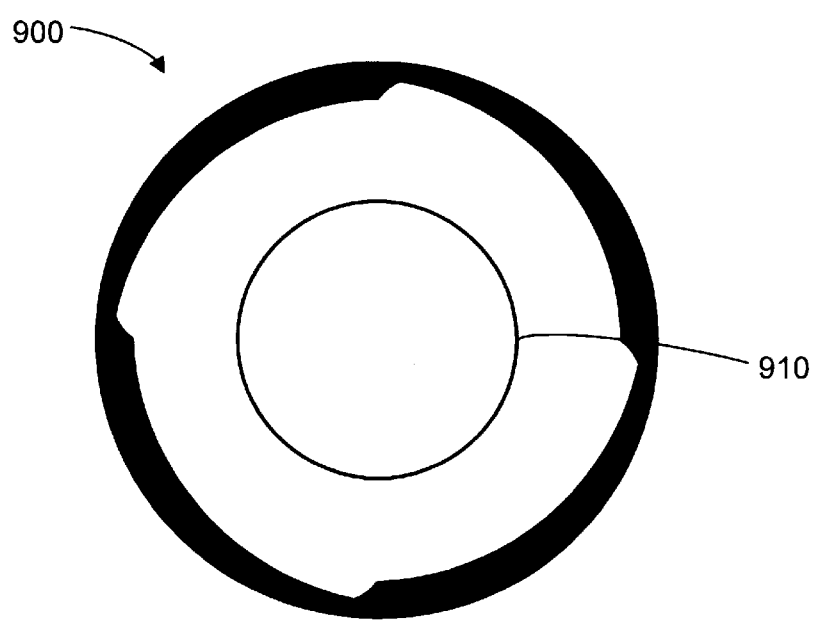
FIG. 11 is a bottom view of a second embodiment of a coupling section corresponding to the sleeve section shown in FIG. 10.

FIGS. 8 and 9 in combination and FIGS. 10 and 11 in combination show two embodiments of a mechanism for detachably joining sleeve section 800 with coupling section 900. Essentially, FIGS. 8 and 9 display an interlock mechanism and FIGS. 10 and 11 display a pressure fit mechanism. As shown in FIGS. 8, 10, and 12, sleeve section 800 possesses a relatively short wall 820 that is juxtaposed against the coupling section 900 when the two are joined together. For the embodiment shown in FIGS. 8 and 9, L-shaped slots 830 are formed in wall 820 that are capable of receiving corresponding tabs 930 formed on coupling section 900. By aligning L-shaped slots 830 and tabs 930, sleeve section 800 can be joined with coupling section 900 and then locked in position by twisting. For the embodiment shown in FIGS. 10 and 11, wall 820 is formed to possess varying widths about its circumference defining relatively wide and narrow regions while coupling section 900 possesses corresponding narrow and wide regions. By aligning the wide regions of wall 820 with the narrow regions of coupling section 900, sleeve section 800 can be joined with coupling section 900 and then squeezed into a pressure-fit position by twisting.

Figure 13:
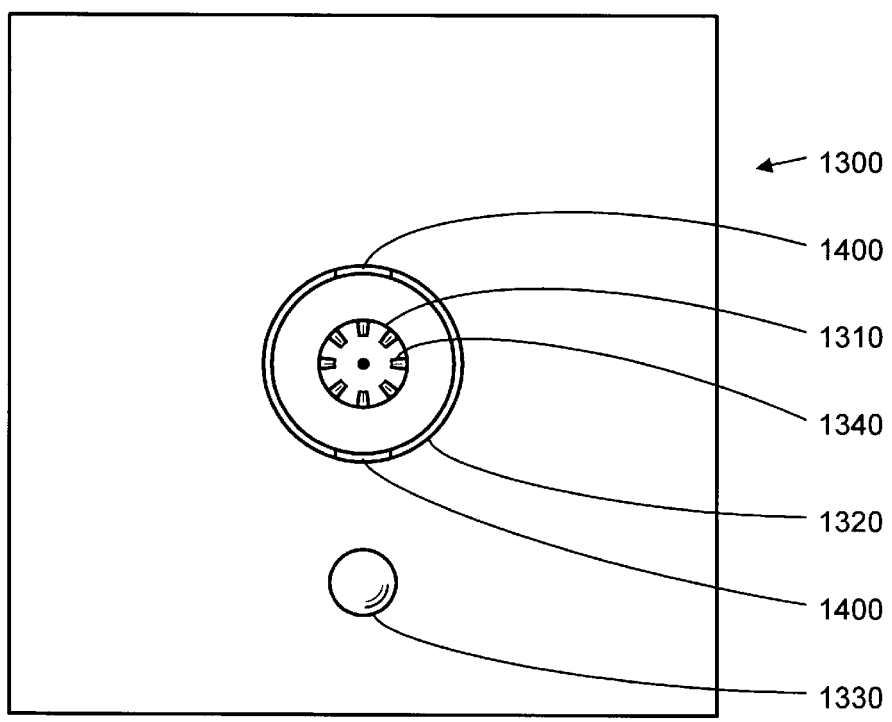
FIG. 13 is a top view of motor housing unit according to an alternative preferred embodiment the present invention.

Referring now to FIG. 13, a top view of motor housing unit 1300 is presented showing motor gear 1310, collar 1320, and pressure switch 1330. The teeth 1340 of motor gear 1310 are suitably sized and positioned to encourage snug engagement with a similar whisk gear 530 shown in FIGS. 5 and 6 and discussed above. To encourage whisk gear 530 and motor gear 1310 to slide easily into snug engagement, teeth 1310 are also peaked. Teeth 1310 could be fewer or greater in number than shown in FIG. 13 yet, the peaked teeth could still encourage sliding easily into a snug engagement if teeth 1310 are sized and positioned suitably. While the appended figures indicate a motor gear 1310 and whisk gear 530 that are substantially similar, it is equally conceivable that other gears could be utilized in keeping with the principles discussed that accomplish substantially the same purpose.

Figure 14:
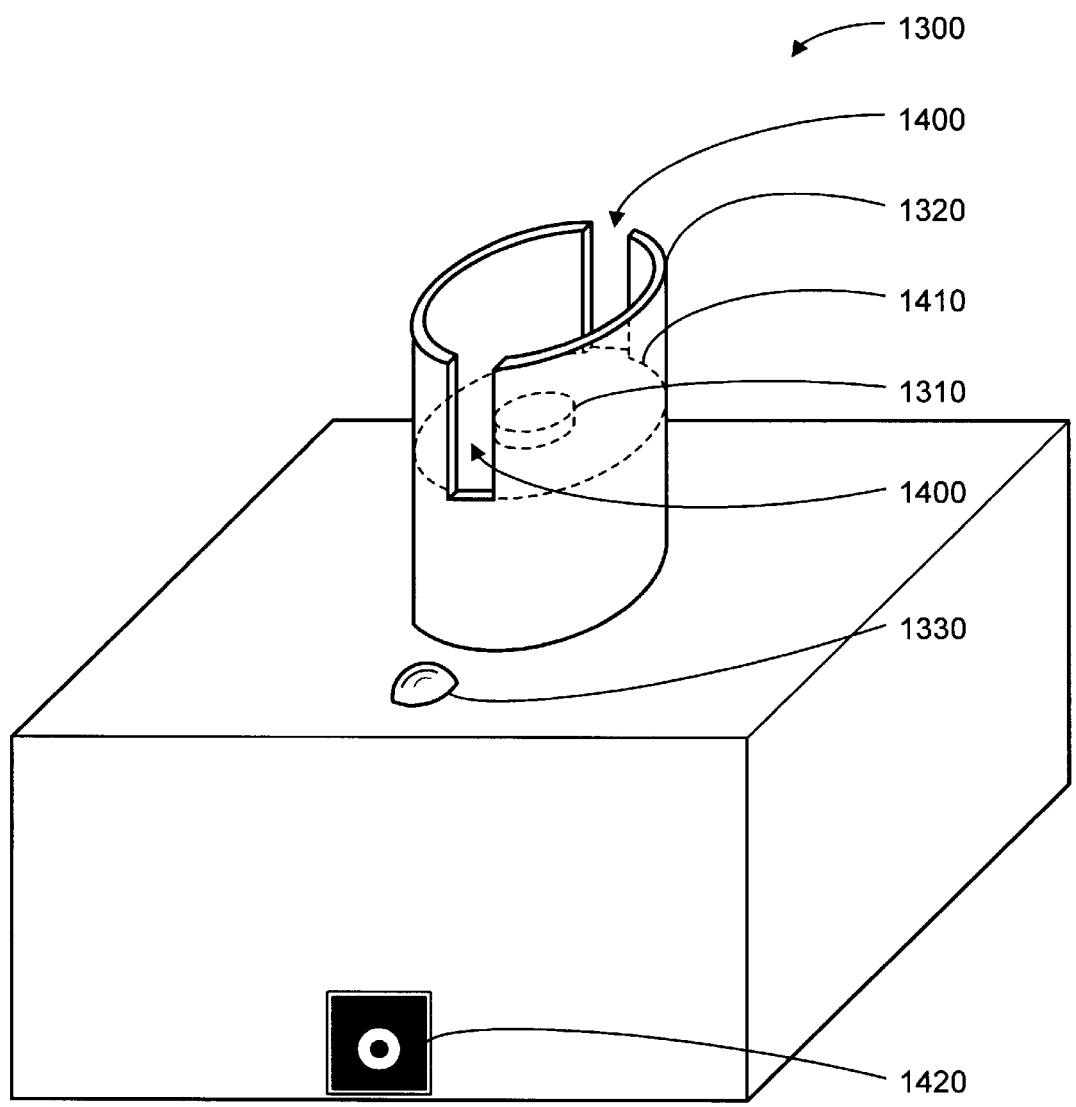
FIG. 14 is a top perspective view of the motor housing unit shown in FIG. 13.
Figure 15:
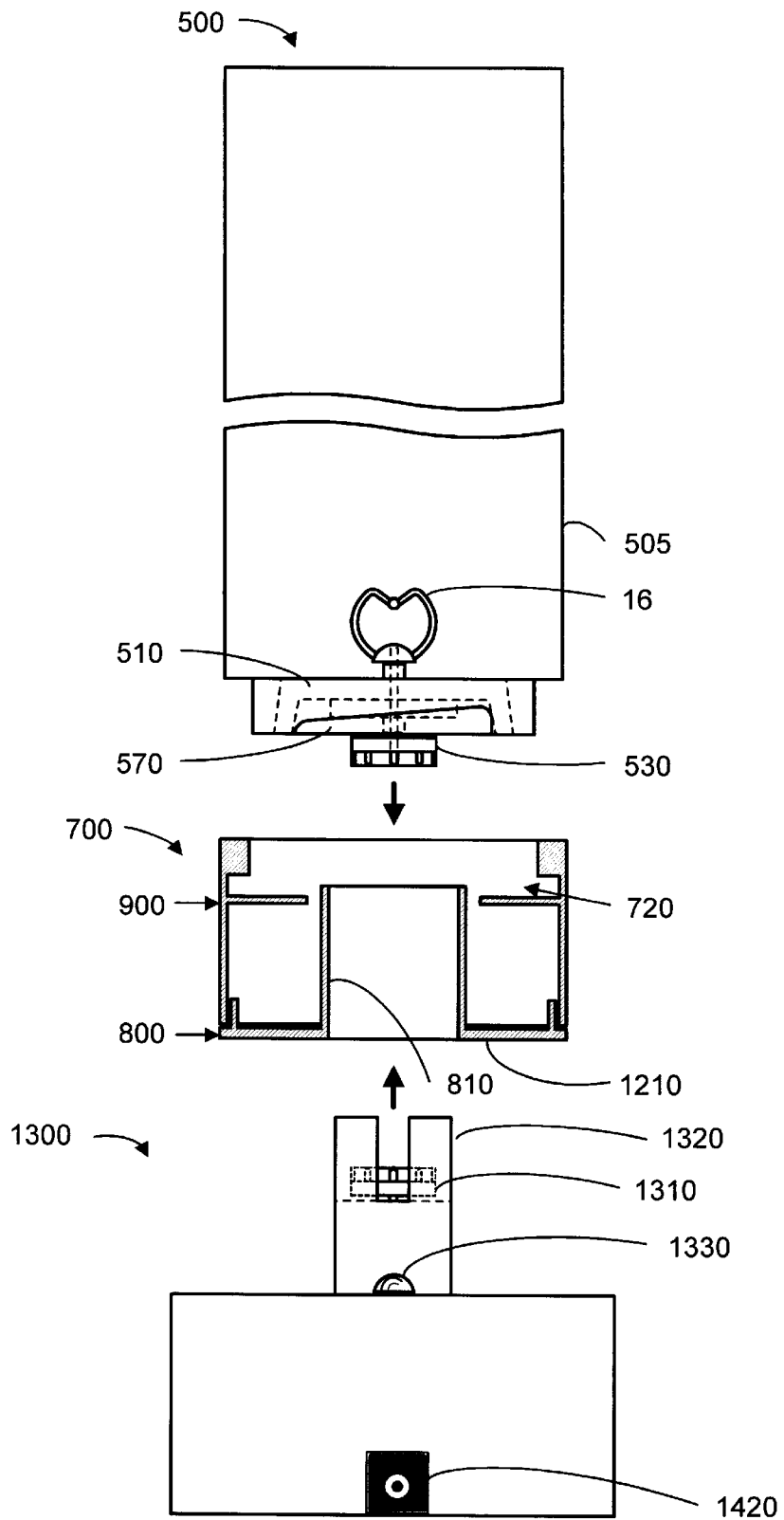
FIG. 15 is an exploded view showing the relationship of the container in FIG. 5, the base in FIG. 12, and the motor housing unit in FIG. 14.

Both FIGS. 13 and 14 show motor housing unit 1300 with collar 1320 that provides significant benefits over conventional mixer apparatus. First, collar 1320 surrounds and partially encloses motor gear 1310, preventing a user from interfering with motor gear 1310 while the motor is running. Manipulation of motor gear 1310 while the motor is running could damage the motor. Second, collar 1320 provides a stable guide for aligning motor gear 1310 with whisk gear 530. When container 500 is coupled to base 700 and base 700 is placed on motor housing unit 1300, collar 1320 slides within sleeve 810 and accurately guides whisk gear 530 into engagement with motor gear 1310. Of course detachable base 700 similarly makes possible this advantage of a stable guide by providing sleeve 810.

Pressure switch 1330 is provided for automatically activating the motor connected to motor gear 1310. When pressure switch 1330 is depressed, the motor activates and begins turning, motor gear 1310 likewise begins turning, as does whisk gear 530 when engaged with motor gear 1310. Finally, since whisk gear 530 is turning, so will whisk 16, thus mixing the contents of container 500. Care must be exercised in positioning motor gear 1310 and whisk gear 530 with respect to pressure switch 1330. Preferably, pressure switch 1330 possesses a pressure limit, whereby a full container 500 of liquid can rest upon motor housing unit 1300 with footing 1210 in contact with pressure switch 1330, but without activating the motor. With the application of additional downward pressure by a user, the motor will then activate. When the full container 500 of liquid is resting on motor housing unit 1300 and the motor is not activated, motor gear 1310 and whisk gear 530 should be substantially engaged. With the application of additional pressure, motor gear 1310 and whisk gear 530 should be brought into snug engagement simultaneous to activation of the motor. In combination with the guide for aligning the gears, such a process of engaging the gears and activating the motor ensures that the gears to not grind together or become damaged and that whisk 16 rotates properly.

FIG. 14 also displays slots 1400, gear platform 1410, and jack 1420. Because collar 1320 surrounds motor gear 1310, slots 1400 are provided to allow drainage of any liquid inside collar 1320 and to allow easy access for cleaning. Gear platform 1410 is provided to support motor gear 1310 at a height elevated above pressure switch 1330 wherein motor gear 1310 properly engages with whisk gear 530 as discussed above. Also, gear platform 1410 shields the motor from any liquid applied or spilled onto motor housing unit 1300. Finally, jack 1420 is provided whereby motor housing unit 1300 may be connected to an electrical outlet independent of batteries installed within motor housing unit 1300. Notably, because of the position of jack 1420 low on the side of motor housing unit 1300, if motor housing unit 1300 were used with a tray similar to tray 22 shown in FIGS. 2 and 3, then modification to tray 22 would be necessary. Namely, a recess (not shown) must be provided for inserting a plug through the side of tray 22 and into jack 1420. However, the advantage to this arrangement is that jack 1420 is placed in a discrete location practically out-of-view, yet, access is provided through the recess if power from an electrical outlet is required.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation.

The invention claimed is:

1. A mixer and tray system comprising:
   a container having a bottom and a top;
   an opening in the top of the container;
   a whisk rotatably mounted in the container;
   a housing unit having a motor therein and a collar;
   a sleeve in the bottom of the container capable of receiving the collar;
   a connection mechanism for engaging the whisk with the motor to rotate the whisk when the collar is inserted into the sleeve and the motor is activated;
   a pressure switch disposed in the housing unit capable of being depressed by the bottom of the container when the collar is inserted into the sleeve, wherein depressing the switch a predetermined amount activates the motor;
   a tray;
   a receptacle in the tray for receiving the housing unit; and
   a plurality of holders in the tray, each capable of receiving the container.

2. The apparatus of claim 1, wherein the connection mechanism comprises a whisk gear connected to the whisk through an aperture in the bottom of the container and a motor gear connected to the motor, wherein the collar surrounds the motor gear, and wherein the collar and sleeve provide a stable guide for aligning and engaging the motor gear and the whisk gear.

3. The apparatus of claim 1, wherein a portion of the container is detachable from a two-piece base having a sleeve section defining the sleeve in the bottom of the container and a coupler section, wherein the sleeve section and coupler section are joined by an interlock mechanism.

4. The apparatus of claim 1, wherein a portion of the container is detachable from a two-piece base having a sleeve section defining the sleeve in the bottom of the container and a coupler section, wherein the sleeve section and coupler section are joined by a pressure fit mechanism.

5. The apparatus of claim 1, wherein the bottom of the container has a footing for contacting and depressing the pressure switch and wherein the predetermined amount of depressing the pressure switch to activate the motor is not achieved when the container is filled with water and is resting upon the pressure switch.

6. A mixer and tray system comprising:
   a container having a bottom, a top, and a portion detachable from a two-piece base having a sleeve section and a coupler section joined by an interlock mechanism;
   an opening in the top of the container;
   a whisk rotatably mounted in the container;
   a housing unit having a motor therein and a collar;
   a sleeve in the sleeve section capable receiving the collar;
   a whisk gear connected to the whisk through an aperture in the bottom of the container;
   a motor gear connected to the motor, wherein the collar surrounds the motor gear, and wherein the collar and sleeve provide a stable guide for aligning and engaging the motor gear and whisk gear such that the whisk rotates when the collar is fully inserted into the sleeve and the motor is activated;
   a pressure switch disposed in the housing unit capable of being depressed by a footing of the sleeve section, wherein a pressure limit prevents the motor from activating when the container is filled with water and connected to the two-section base while the container is resting upon the pressure switch;
   a tray;
   a receptacle in the tray for receiving the housing unit; and
   a plurality of holders in the tray, each capable of receiving the container.

* * * * *